United States Patent [19]

Fought et al.

[11] Patent Number: 5,002,325

[45] Date of Patent: Mar. 26, 1991

[54] FLUID STORAGE TANK FOR FOLD-DOWN TRAILER

[75] Inventors: David Fought, Wolcottville; Homer Ratliff, Topeka, both of Ind.

[73] Assignee: Starcraft Corporation, Goshen, Ind.

[21] Appl. No.: 379,587

[22] Filed: Jul. 12, 1989

[51] Int. Cl.$^5$ ............................................. B60R 7/04
[52] U.S. Cl. ................................ 296/37.14; 296/156; 296/165; 296/27; 280/830; 280/834
[58] Field of Search ............... 296/156, 164, 165, 181, 296/168-176, 27, 37.14, 37.1; 280/839, 830, 833, 834, 789

[56] References Cited

U.S. PATENT DOCUMENTS

| | | | |
|---|---|---|---|
| 2,808,892 | 10/1957 | Walker | 280/834 |
| 4,017,116 | 4/1977 | Hulsey | 296/26 |
| 4,261,613 | 4/1981 | Alford | 296/165 |
| 4,728,144 | 3/1988 | Crean | 296/168 |
| 4,746,164 | 5/1988 | Crean | 296/37.14 |
| 4,754,998 | 7/1988 | LeJuerrne | 296/173 |

*Primary Examiner*—Robert R. Song
*Attorney, Agent, or Firm*—Barnes & Thornburg

[57] ABSTRACT

An enclosed fluid storage tank for a fold-down trailer or similar vehicle which is mounted on the vehicle frame and extends into the vehicle chassis. Preferably, the fluid storage tank is mounted over the vehicle axle member to minimize the effect of varying fluid level and weight on the towing characteristics of the vehicle. In certain preferred embodiments, the fluid storage tank is mounted entirely below the top surface of the vehicle chassis and below the vehicle floor. The fluid storage tank can be secured to the vehicle chassis along two longitudinally extending ledges between a floor covering and two removable secodary longtiudinal support members. A vertically offset portion in the bottom surface of the fluid storage tank provides clearance for the vehicle axle member and a clearance channel provides clearance for lifting mechanism cables which extend through the vehicle chassis. The fluid storage tank also incudes an access opening which allows withdrawal of fluid from its interior and at least one, or preferably two, vents for venting the interior of the fluid storage tank.

25 Claims, 2 Drawing Sheets

FLUID STORAGE TANK FOR FOLD-DOWN TRAILER

BACKGROUND AND SUMMARY OF THE INVENTION

The present invention relates generally to a new and novel fluid storage tank for mounting on a vehicle frame. More particularly, the present invention relates to a fluid storage tank which is capable of being readily mounted in a fold-down trailer or similar vehicle.

The concept of a fold-down trailer as a popular shelter for individuals and families when camping is well-known. Many people prefer a fold-down trailer because they provide a compact trailer when being towed, while at the same time are capable of providing expanded living area when the trailer is parked at a camp site or other convenient location. Fold-down trailers are generally lighter in weight than conventional trailers and also have less wind resistance when being towed due to its smaller exposed cross-sectional area. Thus, fold-down trailers generally provide better gasoline mileage for the towing vehicle than when towing most conventional camping trailers.

In order to quickly convert a fold-down trailer from its closed, compact traveling configuration to its opened, habitable configuration, a lifting mechanism is often provided. One common lifting mechanism includes a rotatable crank handle, often positioned on one side near the back of the trailer. The rotatable crank handle is attached through a gear assembly to a series of cables which extend longitudinally through the chassis of the fold-down trailer. The cables are attached to lifter posts, normally one positioned in each corner of the trailer. The lifter posts are attached to a collapsible tent portion of the fold-down trailer. The lifting mechanism thus allows the collapsible tent portion to be raised or lowered in response to the rotation of the crank handle.

It is sometimes desirable to have a fluid storage tank, often for storing drinking water, installed in a fold-down trailer. For example, when camping at many campgrounds, fresh water is not readily available, and it is beneficial to have a supply in the trailer. In the past, fluid storage tanks have been located in such locations as under dinette seats or in a cabinet under a kitchen sink. However, placing a fluid storage tank in these locations can present at least two difficulties. First, because of the compact size of the closed fold-down trailer, storage space is limited. Placing a fluid storage tank in these traditional locations prevents the areas from being utilized for other types of storage. Secondly, the proximity of the fluid storage tank to the trailer wheel and axle assembly can affect the towing characteristics of the fold-down trailers. This is particularly the case with fold-down trailers since with their light weight, the fluid can be a significant portion of the total weight of the fold-down trailer. The effect is increased because the fluid storage tank is often located a significant distance, both longitudinally away and vertically above, the wheel and axle assembly.

U.S. Pat. No. 4,728,144 to Crean for a Trailer Construction and U.S. Pat. No. 4,746,146 to Crean for Motorhomes both disclose the placement of fluid storage tanks on top of the chassis of a trailer and motor home, respectfully, above the wheel and axle assembly. In these patents, a series of joist members are utilized to elevate the floor of the living area. Fluid storage tanks are then positioned in the space between the vehicle chassis and the elevated floor. Because the overall height of a full-size trailer or motorhome can be readily increased to accommodate this elevated floor, this arrangement performs well in these types of units. However, in fold-down trailers, it is desirable to keep the overall height at a minimum, and, thus, the additional height required for an elevated floor is not readily available.

Attempts at placing a fluid storage tank below the floor in a fold-down camper have been difficult because it is normally desirable to place the floor directly on the top surface of the trailer chassis in order to minimize the overall height of the trailer. Thus, placement of the fluid storage tank below the floor can interfere with the wheel and axle assembly, chassis structural members and the lifting mechanism. These devices are usually included in this area, thus limiting the space available for a fluid storage tank.

It should be noted that many of the difficulties described for the placement of fluid storage tanks in fold-down trailers may also be present in other small trailers where the compact size limits the living and storage space available.

Accordingly, an object of the present invention is the provision of a fluid storage tank which is positioned substantially below the top surface of the vehicle chassis in order to maximize the amount of storage space available in the interior of the vehicle.

Another object of the present invention is to provide a fluid storage tank for a towable vehicle which is mounted in close proximity to the vehicle axle member in order to minimize the effect of varying fluid level and weight on the towing characteristics of the towable vehicle.

A further object of the present invention is to provide a fluid storage tank for a fold-down camping trailer which does not interfere with the lifting mechanism that converts a fold-down trailer from its closed, traveling configuration, to and from, its open, habitable configuration.

These and other objects of the present invention are attained by the provision of an enclosed fluid storage tank which is positioned substantially below the top surface of the vehicle chassis and is preferably mounted over the vehicle axle member. In some preferred embodiments, the fluid storage tank is capable of being mounted entirely below the top surface of the vehicle chassis. Preferably, the fluid storage tank is secured to the vehicle chassis between the floor covering and removable secondary longitudinal support members along two longitudinally extending ledges. In certain preferred embodiments, the fluid storage tank includes a vertically offset portion which provides clearance for the axle member and a clearance channel which provides clearance for lifting mechanism cables which extend through the vehicle chassis. The fluid storage tank also includes an access opening which provides access to the interior of the fluid storage tank and at least one, or preferably two, vents for venting the interior of the fluid storage tank as fluid is withdrawn.

Other objects, advantages and novel features of the present invention will become apparent from the following detailed description of the invention when considered in conjunction with the accompanying drawings.

DETAILED DESCRIPTION OF THE DRAWINGS

Figure 1:
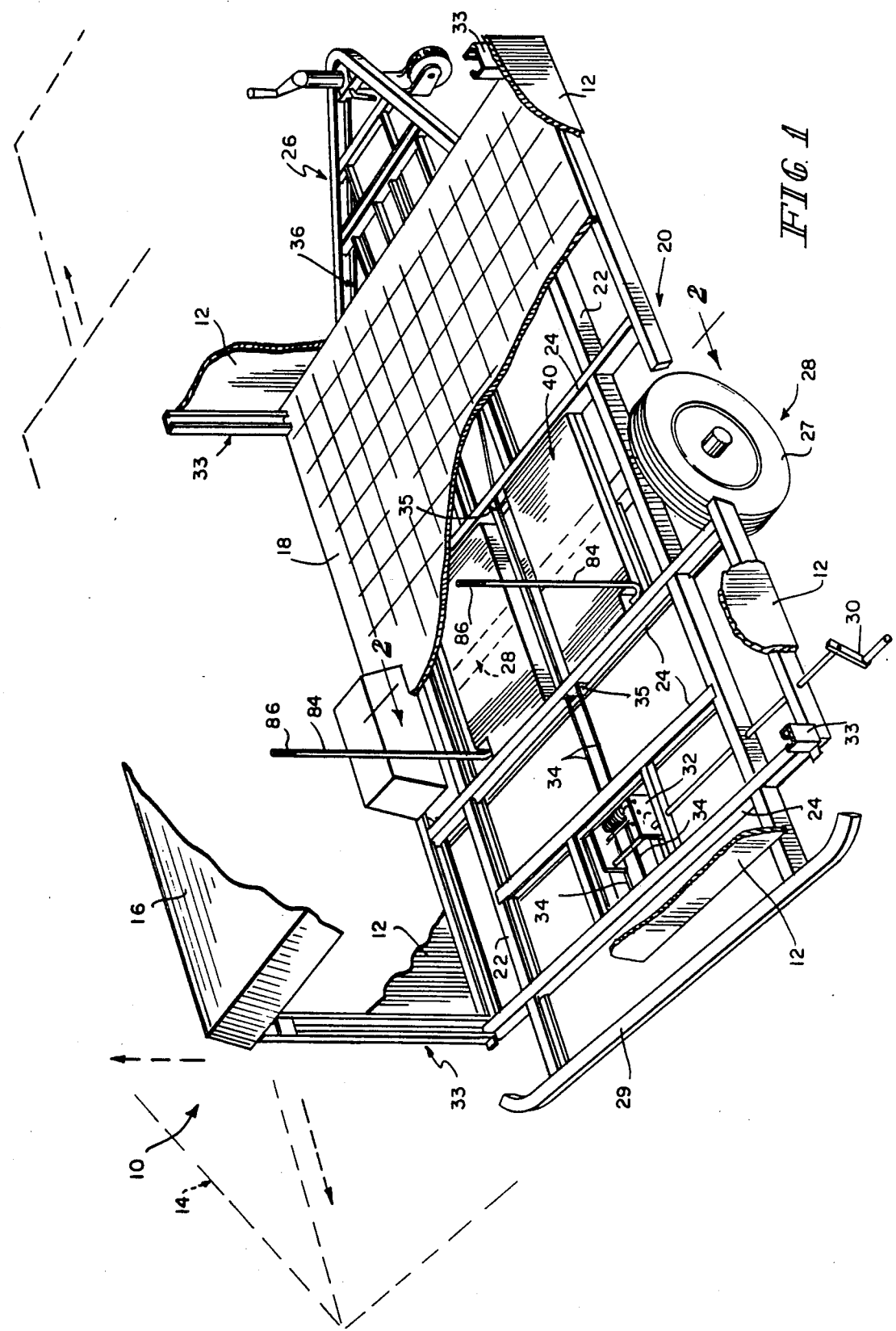
FIG. 1 is a perspective view of a preferred embodiment of a fold-down trailer according to the present invention with portions of the drawing cut away for purposes of illustration.

Referring now to the drawings, in which like referenced characters indicate corresponding elements throughout the several views, attention is first directed to FIG. 1 which illustrates a preferred embodiment of a fold-down trailer, designated generally by the number 10 with enclosed fluid storage tank 40. Fold-down trailer 10 is of conventional construction and includes wall portions 12 on the front, back and two sides. Collapsible tent 14 is attached to top surface 16 of wall portions 12. Collapsible tent is convertible from an open habitable configuration where it can be utilized for camping, and a collapsed configuration for towing and storage. When closed, collapsible tent 14 is folded and stored on top surface 16 as a compact trailer ready for traveling.

Wall portions 12 are mounted onto vehicle chassis 20 using conventional means. Flooring surface 18 extends between wall portions 12 and is placed directly onto the top surface of vehicle chassis 20 to form the floor of fold-down trailer 10. Vehicle chassis 20 includes at least two longitudinally extending support members 22 and a plurality of transverse support members 24 which are preferably fabricated from steel extrusions having substantially C-shaped rectangular cross-sections. In preferred embodiments, longitudinally extending support members 22 and transverse support members 24 are joined by conventional welding techniques. It should be recognized that the size and spacing of longitudinally extending support members 22 and transverse support members 24 are dependent upon the final size and weight of the completed fold-down trailer.

Towing assembly 26 is located at front end 36 of fold-down trailer 10 and includes provisions for attaching fold-down trailer 10 to a towing vehicle (not shown), such as an automobile or truck. Axle member 28 is positioned intermediate of towing assembly 26 and rear end 29 of fold-down trailer 10. Wheels 27 are rotatably attached at both ends of axle member 28. Preferably, fold-down trailer 10 has a lifting mechanism which includes rotatable handle 30, gear device 32, a series of cables 34 and support posts 33. The lifting mechanism is utilized to assist in setting up and taking down collapsible tent 14. Cables 34 preferably extend through openings 35 in transverse support members 24 from gear device 32 towards front end 36 of vehicle chassis 20 and from gear device 32 towards rear end 29 of vehicle chassis 20. Cables 34 are attached to support posts 33 so as to raise and lower support posts 33 in response to rotation of rotatable handle 30.

Enclosed fluid storage tank 40 is preferably positioned intermediate of longitudinally extending support members 22 over axle member 28. Preferably, two secondary longitudinal support members 44 are removably attached at each end to transverse support members 24 by means of fastener 43, such as a conventional nut and bolt. Because transverse support members 24 and secondary longitudinal support members 44 are substantially perpendicular to each other, preferably, fluid storage tank 40 is substantially square or rectangular in configuration. This configuration allows the capacity of the interior of fluid storage tank 40 to be maximized while allowing it to be positioned in the limited space available.

Figure 2:
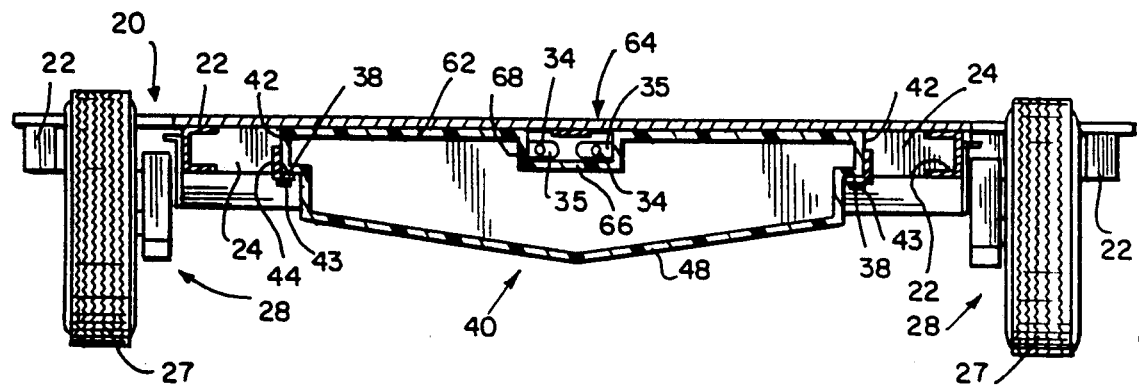
FIG. 2 is a transverse cross-sectional view of the fluid storage tank and chassis taken across line 2—2 of FIG. 1.

As seen more clearly in FIG. 2, fluid storage tank 40 is preferably supported on two longitudinal ledges 42 which contact top surface 38 of secondary longitudinal support members 44. In the preferred embodiment shown, flooring surface 18 secures longitudinal ledges 42 to secondary longitudinal support members 44 without any independent clamps. However, it should be recognized that independent clamps may be utilized to secure ledges 42 to secondary longitudinal support members 44 if desired.

Figure 3:
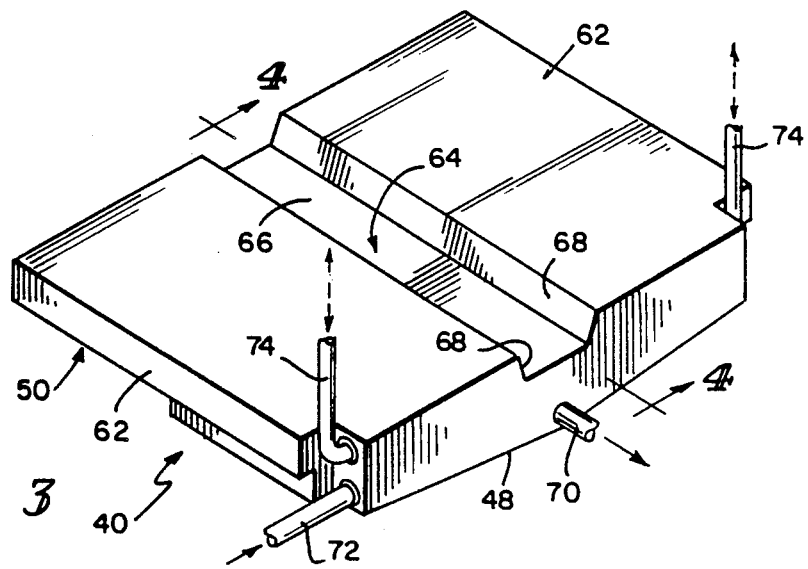
FIG. 3 is an upper perspective view of the preferred embodiment of the fluid storage tank shown in FIG. 1.
Figure 4:
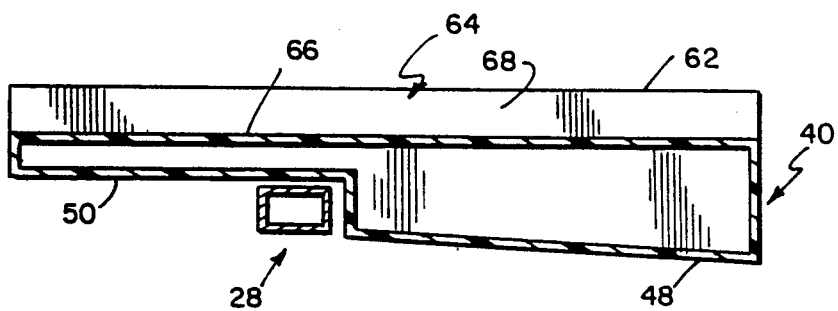
FIG. 4 is a longitudinal cross-sectional view taken across line 4—4 of FIG. 3.

Bottom surface 48 of fluid storage tank 40 includes a vertically offset portion 50 which provides clearance for axle member 28 as shown in FIGS. 3 and 4. While, in the preferred embodiment shown, vertically offset portion 50 extends completely to the front of fluid storage tank 40, it should be recognized that bottom surface 48 could project downwardly along both sides of axle member 28. However, such a design would make the removal of all fluid from fluid storage tank 40 more difficult since more than one withdrawal opening would be required to drain both downwardly extending portions. If each downwardly extending portion did not have its own withdrawal opening, some fluid would remain in the downwardly extending portion of fluid storage tank 40 not drained, which is generally an undesirable situation. Also, having vertically offset portion 50 extend only to the front of axle member 28 provides some protection from axle member 28 against puncture of fluid storage tank 40, when fold-down trailer 10 is pulled over a protrusion, such as an exposed tree stump or rock.

Top surface 62 of fluid storage tank 40 includes clearance channel 64 which allows cables 34 to extend the entire length of fluid storage tank 40. Clearance channel 64 preferably includes bottom horizontal portion 66 and two vertical side portions 68. However, it should be recognized that other clearance channel configurations could be used, including a semicircular configuration or two vertical side portions joined by a bight. However, utilizing bottom horizontal portion 66 and two vertical side portions 68 provides adequate clearance for cables 34, while minimizing the loss of fluid storage volume in the interior of fluid storage tank 40.

Fluid storage tank 40 is preferably positioned entirely below the top surface of vehicle chassis 20 to maximize the available living and storage space in the interior of fold-down trailer 10. Fluid storage tanks 40 which extend partially above the top surface of vehicle chassis 20 can also be accommodated to increase the capacity of fluid storage tank 40. However, some of the available space in the interior of fold-down trailer 10 would be lost with this arrangement. Even if a portion of fluid storage tank 40 extends above the top surface of vehicle chassis 20, preferably a substantial portion extends below the top surface of vehicle chassis 20 in order to minimize the loss of space in the interior of fold-down trailer 10. In certain preferred embodiments, fluid storage tank 40 is positioned entirely below the top surface of vehicle chassis 20, and the fluid capacity of fluid storage tank is approximately eighteen gallons.

Fluid storage tank 40 includes at least one access opening for providing access to the interior of fluid storage tank 40. Preferably, withdrawal opening 70 is connected by withdrawal hose 80 to a faucet or other fluid withdrawal device (not shown) in order to withdraw fluid from the interior of fluid storage tank 40. Separate fill opening 72 is also provided for filling the interior of fluid storage tank 40 with fluid independent of withdrawal opening 70. Fill opening 72 is connected by fill hose 82 to a fill port (not shown) on the outside of wall portion 12. Preferably, fill port (not shown) is partially blocked by a stop (not shown) which prevents a water hose or other fluid filling device (not shown) from entering too far into fill port (not shown). Thus, stop (not shown) minimizes the possibility of overfilling or over-pressurization of the interior of fluid storage tank 40, while still allowing fluid to enter through fill hose 82 and fill opening 72 into the interior of fluid storage tank 40. Preferably, two vents 74 are provided near top surface of fluid storage tank 40. Vents 74 are necessary to vent both vertically projecting portions of fluid storage tank 40 when the fluid level is above bottom horizontal surface 66 of clearance channel 64. Preferably, each vent 74 is connected by a vent hose 84 which extends to a level above flooring surface 18 so as to prevent overflow of fluid through vent hose 84. Also, filter or cover 86 with small openings is placed on the upwardly extending ends of vent hose 84 to prevent insects and other debris from entering into the interior of fluid storage tank 40 while still allowing the passage of air to vent fluid tank 40. As illustrated in FIG. 4, in preferred embodiments, bottom surface 48 of fluid storage tank 40 has a downwardly tapered configuration angled towards withdrawal opening 70 in order to allow a maximum amount of fluid to be withdrawn from the interior of fluid storage tank 40.

To install fluid storage tank 40 in fold-down trailer 20, fasteners 43 at each end of secondary longitudinal support members 44 are removed, and secondary longitudinal support members 44 are removed from vehicle chassis 20. Fluid storage tank 40 is then slid forward with its forward end angled upwardly so that vertically offset portion 50 extends over axle member 28. Once fluid storage tank 40 is in position, secondary longitudinal support members 44 are reattached to vehicle chassis 20 using fasteners 43. Withdrawal hose 80, fill hose 82 and vent hoses 84 are then attached to withdrawal opening 70, fill opening 72 and vents 74, respectively. Fluid storage tank 40 is filled with fluid through fill port (not shown). Once filled the preselected level, fluid can be withdrawn as desired through withdrawal opening 70. During both filling and withdrawal, vents 74 allow the escape and entrance of outside air to prevent a vacuum or overpressurization in the interior of fluid storage tank 40.

To disassemble fluid storage tank 40 from fold-down trailer 10, fluid is first drained from the interior of fluid storage tank 40 and the withdrawal hose 80, fill hose 82 and vent hoses 84 are removed. Bolts 43 at each end of secondary longitudinal support members 44 are removed, and longitudinal support members 44 are removed from vehicle chassis 20. This allows the rear end of fluid storage tank 40 to drop downward at an angle. Fluid storage tank 40 is then slid rearward to clear axle member 28 to complete its removal.

From the preceding description of the preferred embodiment, it is evident that the objects of the invention are attained by the present invention. Although this invention has been described and illustrated in detail, it is to be clearly understood that the same is by way of illustration and example only and is not to be taken by way of limitation. For example, a fluid storage tank according to the teachings of this invention could also be readily utilized in other small trailers, where their compact size makes efficient utilization of space necessary. Therefore, the spirit and scope of this invention are to be limited only by the terms of the appended claims.

What is claimed is:

1. A trailer, comprising:
   a chassis section having a front end, a rear end, a first side and a second side;
   an axle and wheel assembly positioned intermediate said front end and said rear end;
   an enclosed fluid storage means for holding a fluid, said fluid storage means extending into said chassis section and including a passageway through which said axle member traverses; and
   said fluid storage means including an access opening to an interior of said fluid storage tank.

2. The trailer of claim 1 wherein said chassis section includes a plurality of support members and said fluid storage means includes at least a first ledge which rests on at least one of said plurality of support members.

3. The trailer of claim 2 wherein:
   said fluid storage means includes a top surface;
   said chassis section includes a top surface; and
   said top surface of said fluid storage means extends above said top surface of said chassis section.

4. The trailer of claim 2 wherein:
   said fluid storage means includes a top surface;
   said chassis section includes a top surface; and
   said top surface of said fluid storage means does not extend above said top surface of said chassis section.

5. The trailer of claim 2 wherein said first ledge of said fluid storage means is secured between said one of said plurality of support members and a floor covering mounted on a top surface of said chassis section without independent clamps.

6. The trailer of claim 1 wherein:
   said fluid storage means extends substantially the entire width between said first side and said second side of said chassis section;
   said fluid storage means include a first side and a second side having a first and a second ledge, respectively;
   said chassis section including a first and a second support member;
   said first ledge mounted on said first support member; and
   said second ledge mounted on said second support member.

7. The trailer of claim 1 wherein:
   said fluid storage means has a generally rectangular configuration;
   said fluid storage means includes a top surface and a bottom surface; and
   said bottom surface includes a vertically offset portion which provides said passageway through which said axle member transverses.

8. The trailer of claim 1 wherein said fluid storage means includes a first and a second upwardly extending portion and each of said first and said second upwardly extending portion includes an independent venting means for venting said fluid storage means.

9. The trailer of claim 1 wherein said fluid storage means is fabricated from a polyethylene plastic material.

10. The trailer of claim 1 wherein said fluid storage means has a fluid capacity of approximately eighteen gallons and a substantial portion of said fluid capacity extends into said chassis section.

11. A trailer, comprising:
a chassis section having a front end, a rear end, a first side, a second side, a top surface, a first support member and a second support member;
an axle and wheel assembly positioned intermediate said front end and said rear end;
an enclosed fluid storage means for holding a fluid, said fluid storage means located entirely below said top surface of said chassis and extending substantially the entire width between said first side and said second side of said chassis section;
said fluid storage means including an access opening to an interior of said fluid storage tank; and
said fluid storage means including a first ledge which rests on said first support member and a second ledge which rests on said second support member.

12. The trailer of claim 11 wherein said fluid storage means includes substantially perpendicular adjacent surfaces which define a generally rectangular configuration.

13. An enclosed tank to be mounted to a vehicle for storing fluid, comprising:
an enclosure having a top surface and a bottom surface;
said bottom surface including a first and second support means for engaging a frame of said vehicle when mounting said enclosed tank over an axle member of a vehicle; and
an access opening to an interior of said enclosed tank.

14. The enclosed tank of claim 13 wherein said top surface of said enclosed tank includes a clearance channel which allows a lifting mechanism cable to pass therethrough.

15. The enclosed tank of claim 13 wherein: said bottom surface of said enclosed tank includes a vertically offset portion for receiving said axle member.

16. The enclosed tank of claim 15 wherein said top surface of said enclosed tank includes a clearance channel which allows a lifting mechanism cable to pass therethrough.

17. The enclosed tank of claim 16 wherein said enclosed tank includes a first and a second upwardly extending portion and each of said first and said second upwardly extending portion includes an independent venting means for venting said fluid storage means.

18. The enclosed tank of claim 17 wherein said bottom surface of said enclosed tank is tapered downwardly towards said access opening.

19. A fold-down camping trailer, comprising:
a chassis section having a front end, a rear end, a first side, a second side and a top surface;
an axle and wheel assembly positioned intermediate said front end and said rear end;
an enclosure including a front wall portion, a rear wall portion, a first side wall portion and a second side wall portion mounted on said top surface of said chassis section;
a collapsible tent attached to said front wall portion, said rear wall portion, said first side wall portion and said second side wall portion;
a lifting mechanism for erecting said collapsible tent, said lifting mechanism having a cable extending through said chassis and an actuating means for initiating the operation of said lifting mechanism;
an enclosed fluid storage means for holding a fluid, said fluid storage means mounted over said axle and wheel assembly;
said fluid storage means including a clearance channel to provide clearance for said cable to pass through; and
said fluid storage means including an access opening to an interior of said fluid storage means.

20. The fold-down camping trailer of claim 19 wherein said clearance channel extends longitudinally along the entire length of said fluid storage means.

21. The fold-down camping trailer of claim 19 wherein said fluid storage means includes a first side, a second side, a top surface and a bottom surface and said top surface includes said clearance channel which extends the entire length of said fluid storage tank and is substantially centered between said first side and said second side of said fluid storage tank so as to provide a first and a second upwardly extending portion in said fluid storage tank.

22. The fold-down camping trailer of claim 21 wherein each of said first and said second upwardly extending portion includes an independent venting means for venting said fluid storage means.

23. The fold-down camping trailer of claim 19 wherein said bottom surface of said fluid storage means is tapered downwardly towards said access opening.

24. The fold-down camping trailer of claim 19 wherein said bottom surface of said fluid storage means includes a vertically offset portion and said vertically offset portion is mounted over said axle and wheel assembly.

25. The fold-down camping trailer of claim 19 wherein said fluid storage means has a fluid capacity of approximately eighteen gallons and a substantial portion of said fluid capacity is located below said top surface of said chassis section.

* * * * *

UNITED STATES PATENT AND TRADEMARK OFFICE
CERTIFICATE OF CORRECTION

PATENT NO. : 5,002,325

DATED : March 26, 1991

INVENTOR(S) : David Fought, Homer Ratliff

It is certified that error appears in the above-identified patent and that said Letters Patent is hereby corrected as shown below:

On the title page:
  In the Abstract, at line 12, please delete "secodary longtiudinal," and insert "secondary longitudinal" therefor.

Signed and Sealed this

Twenty-eighth Day of July, 1992

*Attest:*

DOUGLAS B. COMER

*Attesting Officer*          *Acting Commissioner of Patents and Trademarks*